(12) United States Patent
Iio et al.

(10) Patent No.: US 6,663,990 B2
(45) Date of Patent: Dec. 16, 2003

(54) FUEL CELL SYSTEM AND METHOD

(75) Inventors: Masatoshi Iio, Kanagawa-ken (JP); Takanori Hiyoshi, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 172 days.

(21) Appl. No.: 09/781,303

(22) Filed: Feb. 13, 2001

(65) Prior Publication Data
US 2001/0014415 A1 Aug. 16, 2001

(30) Foreign Application Priority Data

Feb. 16, 2000 (JP) .................................. P2000-038397
Dec. 22, 2000 (JP) .................................. P2000-390929

(51) Int. Cl.[7] ............................................. H01M 8/04
(52) U.S. Cl. .............................. 429/22; 429/25; 429/30
(58) Field of Search ............................. 429/24, 25, 22, 429/13, 17, 26, 120, 30, 23

(56) References Cited

U.S. PATENT DOCUMENTS 5,853,910 A  * 12/1998  Tomioka et al. ............... 429/17
2002/0006535 A1 *  1/2002  Wood et al. .................... 429/17

FOREIGN PATENT DOCUMENTS

JP            07-263010          10/1995

\* cited by examiner

*Primary Examiner*—Stephen Kalafut
*Assistant Examiner*—R Alejandro
(74) *Attorney, Agent, or Firm*—Foley & Lardner

(57) ABSTRACT

In a fuel cell system and a method of controlling the same, a fuel cell stack 1 is connected at its downstream side with a hydrogen control valve 11 and a hydrogen draw pump 12. A control unit 5 controls the hydrogen draw pump 12 such that hydrogen drawing power is increased to a level larger than that required for normal operation and controls the hydrogen control valve 11 such that opening degree is decreased. After that, the control unit 5 controls the hydrogen control valve 11 such that the opening degree is increased to purge moisture in the fuel cell stack.

10 Claims, 9 Drawing Sheets t0 : DRAWING POWER OF HYDROGEN DRAW PUMP IS INCREASED
t1 : OPENING DEGREE OF HYDROGEN CONTROL VALVE IS DECREASED
t2 : HYDROGEN CONTROL VALVE IS RELEASED
t3 : FLOW RATE OF HYDROGEN GAS TO BE SUPPLIED TO FUEL CELL STACK IS INCREASED
t4 : PRESSURE IS RESET TO PRESET LEVEL(Pop) FOR NORMAL OPERATION
t5 : RECOVERY OF CELL VOLTAGE IS DISCRIMINATED PURGE SEQUENCE IS TERMINATED

FUEL CELL SYSTEM AND METHOD

BACKGROUND OF THE INVENTION

The present invention relates to a fuel cell system and a method of controlling the same, and more particularly, to a fuel cell system of a solid polymer electrolyte type and a method of controlling the same.

It has been proposed to use a fuel cell of a solid polymer electrolyte type that employs a polymer membrane as an electrolyte. The fuel cell of the solid polymer electrolyte type is advantageous over other fuel cells employing liquid electrolyte in that electrolyte is not leaked outside, and is highly expected as a power source in automotive vehicles. In the fuel cell of the solid polymer electrolyte type, the polymer membrane serving as electrolyte does not fully function as an ion conductor unless the polymer membrane is impregnated with moisture to some extent. To overcome this situation, it has been proposed to supply hydrogen gas with moisture to a fuel cell stack as disclosed in Japanese Patent Application Laid-Open Publication No. H7-263010.

SUMMARY OF THE INVENTION

In the event that moisture is supplied to the polymer membrane during operation of the fuel cell of the solid polymer electrolyte type, however, moisture is caused to remain in the polymer membrane by an excessive amount under conditions in that the fuel cell is operated at a low stoichiometric ratio. As a result, surplus moisture is left in the fuel cell, lowering electric power output produced by some fuel cells with a resultant difficulty caused in operating performance of the fuel cell.

In order to overcome such a situation, it is an effective practice to instantaneously exhaust surplus hydrogen gas from the fuel cell, which is not reacted therein, at an increased flow rate and to purge moisture with surplus hydrogen gas from the fuel cell.

In a purging process of moisture, it is thinkable to increase operating pressure of a fuel cell stack for instantaneously increasing the flow rate of hydrogen gas to be exhausted from the fuel cell stack. However, it is contemplated to increase an instantaneous flow rate of hydrogen gas to be exhausted from the fuel cell stack to remove moisture from the fuel cell stack by increasing the operating pressure of the fuel cell stack, resulting in an increase in electric power consumption that is undesirable for the fuel cell of the solid polymer electrolyte type that is intended to be used as the power source of the automotive vehicle.

Also, when a control system that controls the fuel cell of the solid polymer electrolyte type is modified to perform a purge treatment of moisture, the control system is caused to be complicated in structure and the whole structure of the control system is largely sized, with a resultant disadvantage caused in the fuel cell of the solid polymer electrolyte type that serves as the power source of the automotive vehicle.

The present invention has been made in view of the above-described investigation and has an object to provide a fuel cell system and a method controlling the same that are simple in structure and are enable to suitably operate a fuel cell of a solid polymer electrolyte type with a suitable purge treatment of moisture without causing remarkable increase in electric power consumption.

In the present invention, a fuel cell system is provided with: a fuel cell stack of a polymer electrolyte type; a hydrogen supply unit supplying hydrogen gas to the fuel cell stack; an air supply unit supplying air to the fuel cell stack; a hydrogen draw pump located at a downstream side of the fuel cell stack and drawing hydrogen gas from the fuel cell stack; a first hydrogen control valve located between the fuel cell stack and the hydrogen draw pump and having a controllable opening degree; and a control unit controlling operation of the fuel cell system such that, when the control unit discriminates that moisture in the fuel cell stack remains at an excessive level, the control unit increases drawing power of the hydrogen draw pump, decreases the opening degree of the first hydrogen control valve and subsequently opens the first hydrogen control valve while purging moisture from the fuel cell stack.

In other words, a fuel cell system of the present invention is provided with: a fuel cell stack of a polymer electrolyte type; a hydrogen supplying means for supplying hydrogen gas to the fuel cell stack; an air supplying means for supplying air to the fuel cell stack; a hydrogen drawing means for drawing hydrogen gas from the fuel cell stack; an adjusting means for adjusting an opening degree with respect to the hydrogen gas from the fuel cell stack; a controlling means for controlling operation of the fuel cell system such that, when the controlling means discriminates that moisture in the fuel cell stack remains at an excessive level, the controlling means increases drawing power of the hydrogen drawing means, decreases the opening degree of the adjusting means and subsequently opens the adjusting means while purging moisture from the fuel cell stack.

Besides, a method of controlling a fuel cell system of the present invention controls a fuel cell system having a fuel cell stack of a polymer electrolyte type, a hydrogen supply unit supplying hydrogen gas to the fuel cell stack, an air supply unit supplying air to the fuel cell stack, a hydrogen draw pump located at a downstream side of the fuel cell stack and drawing hydrogen gas from the fuel cell stack, a hydrogen control valve located between the fuel cell stack and the hydrogen draw pump and having a controllable opening degree. In the method, operation of the fuel cell system is controlled such that, when it is discriminated that moisture in the fuel cell stack remains at an excessive level, drawing power of the hydrogen draw pump is increased, the opening degree of the first hydrogen control valve is decreased and subsequently the first hydrogen control valve is opened while purging moisture from the fuel cell stack.

Other aspect and advantages of the invention will become apparent from the following description, taken in conjunction with the accompanying drawings, illustrating by way of example the principles of the invention.

DETAILED DESCRIPTION OF THE PREFERRED EMBODIMENTS

A description of a fuel cell system and a method controlling the same in accordance with each of embodiments of the present invention will be in detail given below suitably with reference to the accompanying drawings.

First, a fuel cell system and method of controlling the same according to the first embodiment of the present invention is described in detail with reference to FIGS. 1 to 3.

Figure 1:
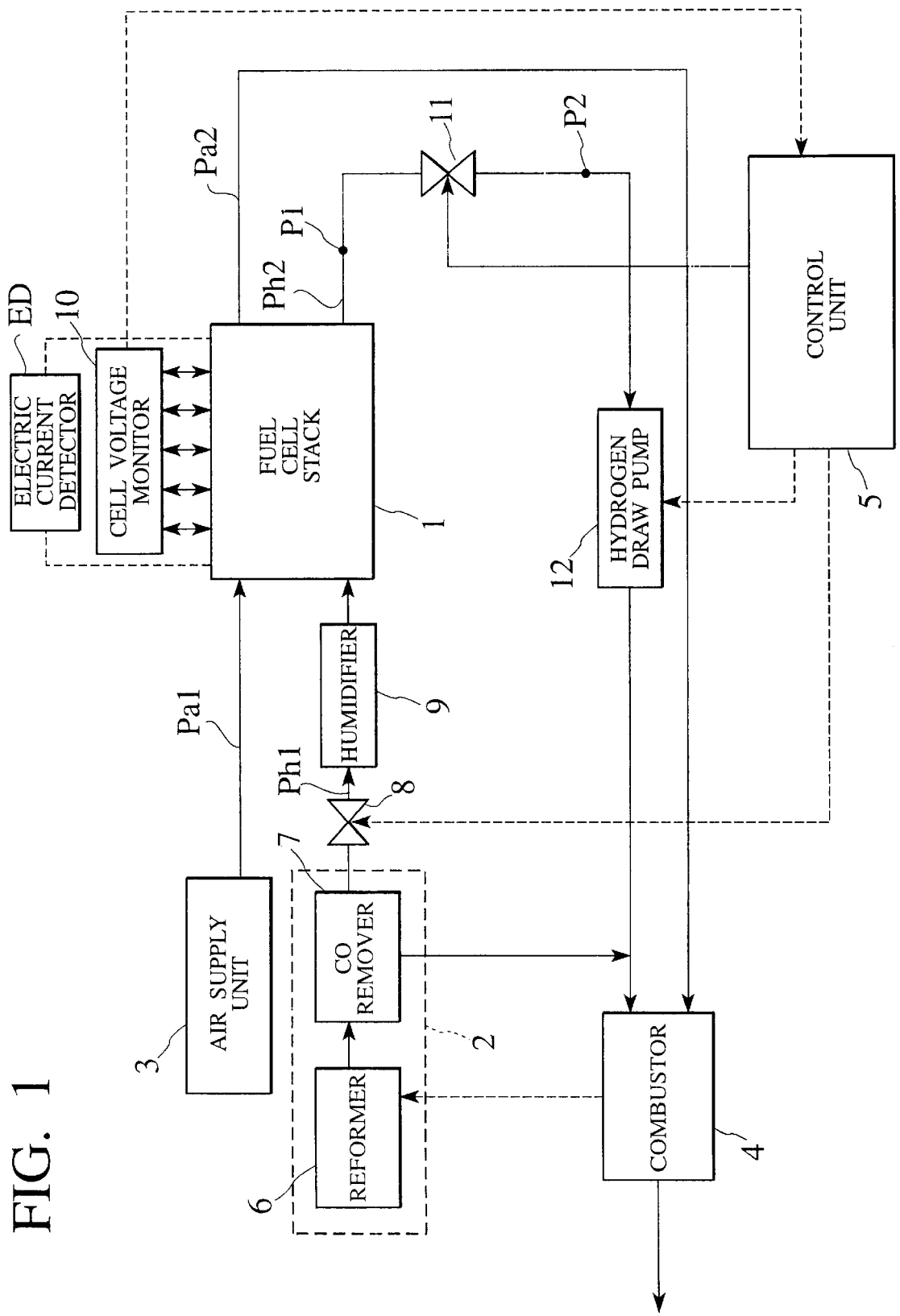
FIG. 1 is a block diagram illustrating a first embodiment of a fuel cell system according to the present invention.

FIG. 1 is a block diagram illustrating a first embodiment of a fuel cell system according to the present invention.

In the first embodiment, the fuel cell system includes a fuel cell stack 1 of a polymer electrolyte fuel cell type employing a polymer electrolyte, a hydrogen supply unit 2 that supplies hydrogen gas as fuel to the fuel cell stack 1, an air supply unit 3 that supplies air through an air supply passage Pa1 to the fuel cell stack 1 as oxidizing agent, a combustor 4 that combusts surplus hydrogen gas exhausted from the fuel cell stack 1, and a control unit 5 that controls various parts of the fuel cell system.

The hydrogen supply unit 2 includes a reformer 6 and a CO remover 7. The reformer 6 reforms fuel such as methanol with steam to produce mixed gas of hydrogen and carbon monoxide. The carbon monoxide gas is removed with the CO remover 7, and pure hydrogen gas is produced. The pure hydrogen gas flowing from the CO remover 7 is conducted through a hydrogen gas supply passage Ph1 to the fuel cell stack 1. Carbon monoxide gas removed from the CO remover 7 is conducted to the combustor 4. It is to be noted here that the hydrogen supply unit 2 may be replaced with a hydrogen tank. Also, the CO remover 7 may be replaced with a hydrogen separation membrane.

The hydrogen gas supply path Ph1 between the hydrogen supply unit 2 and the fuel cell stack 1 has a flow control valve 8 that regulates the flow rate of hydrogen gas to be supplied to the fuel cell stack 1, and a humidifier 9 that humidifies hydrogen gas flowing from the flow control valve 8. Consequently, the fuel cell stack 1 is supplied with hydrogen gas that is humidified with the humidifier 9 such that the polymer electrolyte of the fuel cell stack 1 is supplied with moisture and the polymer electrolyte has an ion conductor. It is to be noted here that, in this embodiment, although the humidifier 9 is located in the hydrogen gas supply path Ph1 to humidify hydrogen gas, hydrogen gas may be humidified in other method, for example, by humidifying hydrogen gas or air to supply moisture to the polymer electrolyte with coolant water that is used for cooling the fuel cell stack 1.

The air supply unit 3 also may include an air compressor and a de-ionization filter such that air is initially compressed with the air compressor and subsequently de-ionized to produce pure air that is supplied to the fuel cell stack 1.

The fuel cell stack 1 produces an output voltage, which is detected by a cell voltage monitor that monitors each cell voltage in the fuel cell stack 1 to produce a detection signal representing a cell voltage. The fuel cell stack 1 is monitored with the cell voltage monitor 10 such that the output voltage produced by each cell is detected to monitor the whole output voltage state of the fuel cell stack 1 at all times. An electric current detector ED is connected to the fuel cell stack 1 to detect electric current flowing therethrough.

The combustor 4 is located at a down stream side of the fuel cell stack 1. The surplus hydrogen gas that are not reacted in the fuel cell stack 1 and surplus air that are not reacted in the fuel cell stack 1 are supplied through an exhaust hydrogen passage Ph2 and an exhaust air passage Pa2, respectively, to the combustor 4. Surplus hydrogen and surplus air are combusted in the combustor 4 that produces a thermal energy. The thermal energy is supplied to the reformer 6 of the hydrogen supply unit 2 and other devices that needs the thermal energy.

A hydrogen control valve 11 is located in the exhaust hydrogen passage Ph2 at a location between the fuel cell stack 1 and the combustor 4 and is controlled by the control unit 5 such that the opening degree of the hydrogen control unit 11 is regulated. A hydrogen draw pump 12 is also located in the exhaust hydrogen passage Ph2 and is controlled by the control unit 5 such that drawing power of hydrogen is controlled. The hydrogen control valve 11 and the hydrogen draw pump 12 have functions to regulate the flow rate and the pressure of hydrogen gas flowing through the exhaust hydrogen passage Ph2, respectively. In the first embodiment of the fuel cell system according to the present invention, the opening degree of the hydrogen control valve 11 and the drawing power of the hydrogen draw pump 12 are controlled by the control unit 5 in a manner as will be described in detail later such that moisture remaining in the fuel cell stack 1 is purged at a desired flow rate.

The control unit 5 includes a CPU, a ROM and a RAM, etc., such that the CPU carries a control program stored in the ROM with the aid of the RAM for thereby controlling the opening degree of the hydrogen control valve 11, the drawing power of the hydrogen draw pump 12 and the other associated parts.

In such a fuel cell system discussed above, hydrogen gas produced by the hydrogen supply unit 2 and humidified with the humidifier 9 and air flowing from the air supply unit 3 are supplied to the fuel cell stack 1, which produces electric power output. Surplus hydrogen gas and surplus air are combusted in the combustor 4, which produces the thermal energy. Under these circumstances, when the fuel cell stack 1 is operating at a low stoichiometric ratio, an excessive amount of moisture remains in the fuel cell stack 1 and surplus moisture remains in the fuel cell sack 1. If surplus moisture remaining inside the fuel cell stack 1 in an excessive amount, an amount of electric power output to be produced by the fuel cell stack 1 is decreased. To overcome this problem, the fuel cell system of the present invention proposes to purge moisture from the fuel cell stack 1 such that product water is removed from the fuel cell stack 1.

Here, a moisture purging process for purging moisture from the fuel cell stack 1 will be described in detail with reference to FIGS. 2 and 3.

Figure 2:
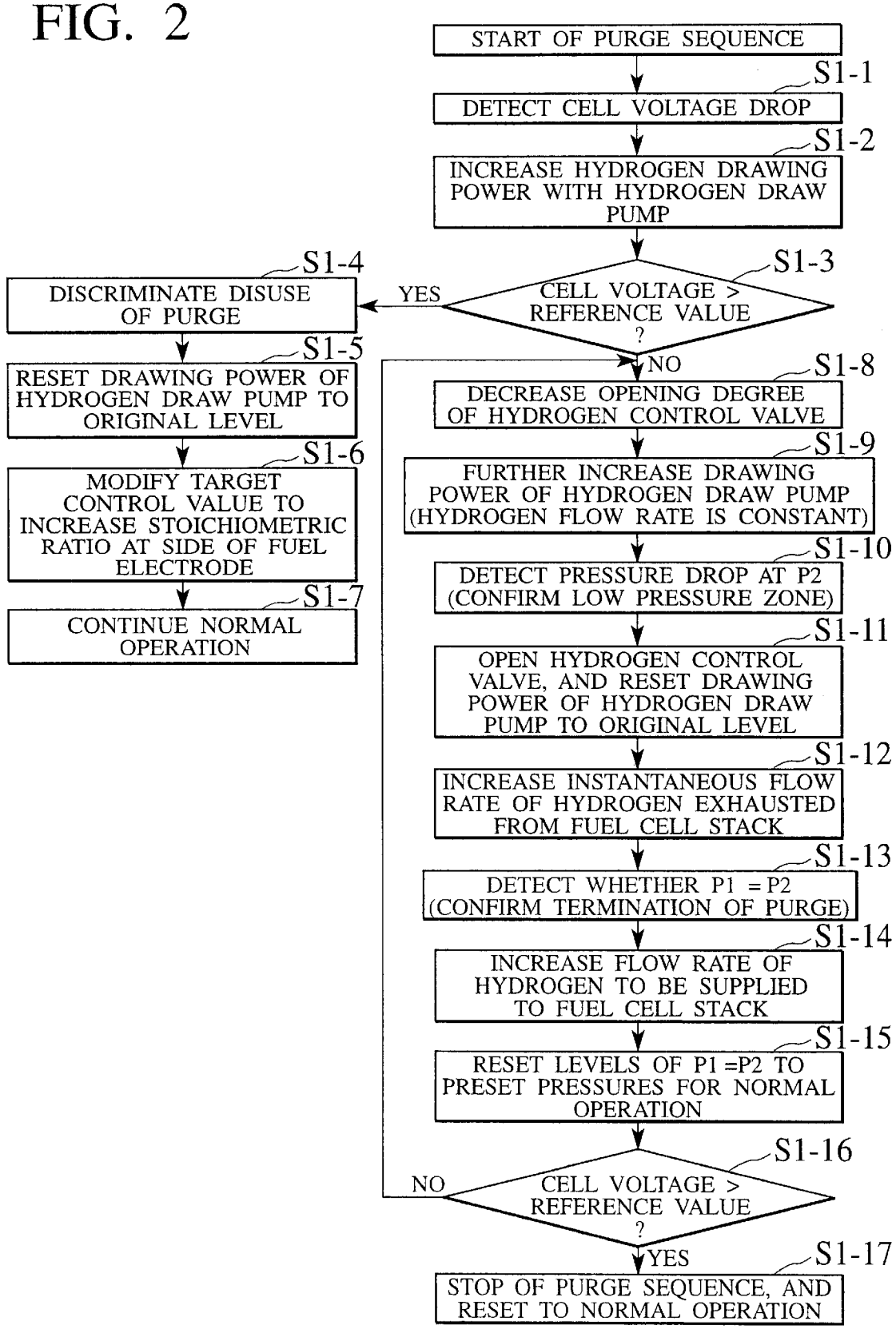
FIG. 2 is a general flow diagram for illustrating the basic sequence of operation of the fuel cell system according to the first embodiment.
Figure 3:
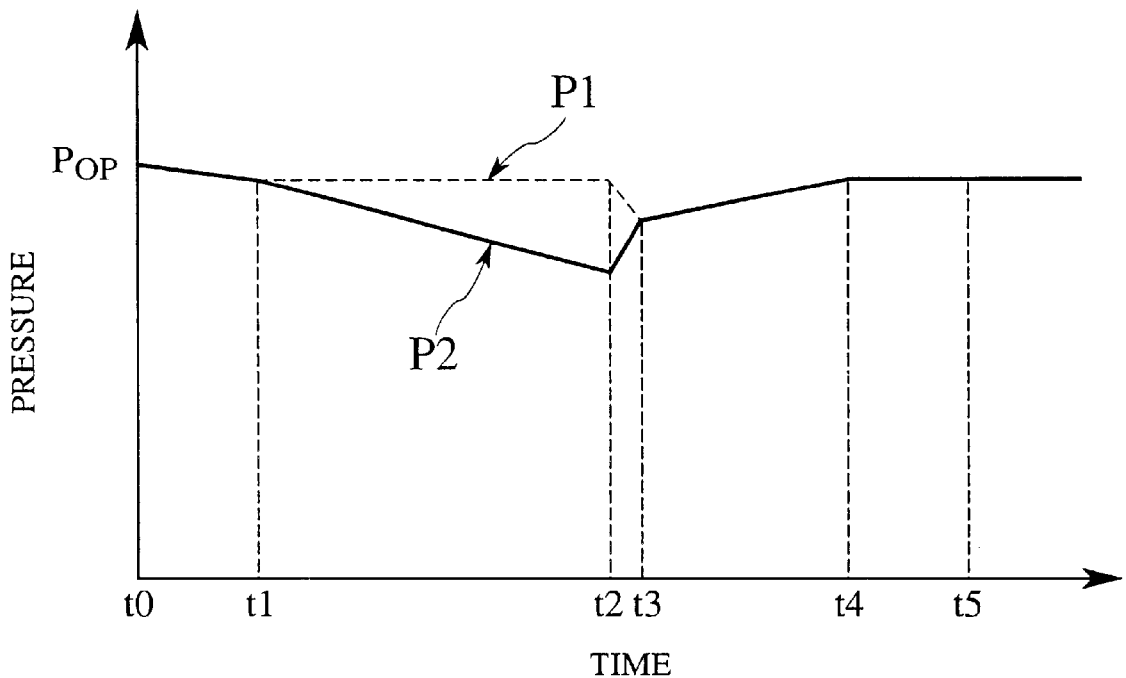
FIG. 3 shows timing diagrams illustrating the operation of a purge sequence according to the first embodiment.

As shown in FIG. 2, at the start, e.g., when purge sequence is started, a voltage drop in the fuel cell stack 1 is detected by the cell voltage monitor 10, in the execution step S1-1, that produces an output signal representing a cell voltage drop. The output signal is then inputted to the control unit 5. The control unit 5 responds to the output signal representing the cell voltage drop and detects that purge is requisite for the fuel cell stack 1. When this occurs, the control unit 5 functions to control the flow control valve 8 such that the stoichiometric ratio is momentarily lowered to protect the fuel cell stack 1.

In the next step S1-2, the control unit 5 functions to increase the operating time of the hydrogen draw pump to a value greater than that required for a normal operation to increase hydrogen drawing power. As a result, a drop in the stoichiometric ratio at the side of a fuel electrode is restricted in a purge sequence. In this event, the pressure at a point P1 in FIG. 1, e.g., the pressure of hydrogen at the upstream side of the hydrogen control valve 11 is slightly lowered by an amount corresponding to the increase in the operating time of the hydrogen draw pump 12 as viewed in time interval t0 to t1 in FIG. 3.

In the succeeding step S1-3, the control unit 5 judges whether output voltage of the fuel cell, produced after the operating time of the hydrogen draw pump 12 is increased to thereby increase hydrogen drawing power, is higher than a preset reference voltage. When the cell voltage is recovered due to increase in the stichiometric ratio at the side of the fuel electrode owing to the increase in the hydrogen drawing power of the hydrogen draw pump 12 and the cell voltage exceeds the reference voltage, the control unit 5 discriminates, in step S1-4, that purge is unnecessary, and functions in step S1-5 to reset the drawing power of the hydrogen draw pump 12 to an original power level. Since, in this event, it is necessary to increase the stoichiometric ratio at the side of the fuel electrode again when the drawing power of the hydrogen draw pump 12 is returned to the original level, the control unit 5 modifies a control target value in step S1-6 such that the stoichiometric ratio at the side of the fuel electrode is increased. In step S1-7, a normal operation of the fuel cell stack 1 is continued.

On the other hand, in the event that the control unit 5 detects in step S1-3 that the cell voltage produced, after the operating time of the hydrogen draw pump 12 is increased to thereby increase hydrogen drawing power, is lower than the reference voltage, the control unit 5 judges that surplus moisture remains in the fuel cell stack 1. Thus, in step S1-8, the control unit 5 decreases the opening degree of the hydrogen control valve 11 such that the hydrogen control valve 11 has increased pressure losses. Consequently, the pressure at point P2 in FIG. 1, e.g., the pressure at the downstream side of the hydrogen control valve 11 is lowered along a curve P2 in FIG. 3 during a time interval between t1 and t2 such that a low pressure zone is created at the downstream side of the hydrogen control valve 11.

If, in the above step, the hydrogen drawing power of the hydrogen draw pump 12 is left to continuously have the increased hydrogen draw power, hydrogen gas is caused to be exhausted from the fuel cell stack 1 at a reduced flow rate. In step S1-9, consequently, the control unit 5 further increases the drawing power of the hydrogen draw pump 12 by an amount equal to a value corresponding to the pressure losses caused by the hydrogen control valve 11. Accordingly, the pressure at point P1 in the upstream side of the hydrogen control valve 11 is kept at substantially constant level as shown by dotted curve P1 in FIG. 3. In this event, the flow rate of hydrogen gas passing through the hydrogen control valve 11 does not vary in a wide range and the pressure at point P2 in the downstream side of the hydrogen control valve 11 is lowered.

In the next step S1-10, when the pressure drop at point P2 in the downstream side of the hydrogen control valve 11 is detected and when a low pressure zone is confirmed at a sufficient level in the downstream side of the hydrogen control valve 11, the control unit 5 fully opens the hydrogen control valve 11 in step S1-11 and decreases the drawing power of the hydrogen draw pump 12 to its original level suited for normal operation. In the succeeding step S1-12, an instantaneous flow rate of the hydrogen gas to be exhausted from the fuel cell stack 1 is increased such that moisture is removed with hydrogen gas and thus product water is purged. Since, in this event, the drawing power of the hydrogen draw pump 12 is set to a low value corresponding to that required for normal operation, the combustor 4 is prevented from being undesirably supplied with a large amount of exhaust hydrogen gas at once.

Note should be taken that after the instantaneous flow rate of the hydrogen gas exhausted from the fuel cell stack 1 is increased and the moisture is purged at an increased flow rate, the pressure at point P1 in the upstream side of the hydrogen control gas 11 and the pressure at point P2 in the downstream side remain at a level slightly lower than the original level for normal operation. In step S1-13, when it is detected that the pressure at point P1 in the upstream side of the hydrogen control vale 11 substantially equals the pressure at point P2 in the downstream side and that purge of moisture is terminated, the control unit 5 controls the flow control valve 8 in step S1-15 such that hydrogen gas is supplied to the fuel cell stack 1 from the hydrogen supply unit 2 at an increased flow rate. In step S1-15, accordingly, the pressure at point P1 in the upstream side of the hydrogen control valve 11 and the pressure at point P2 in the downstream side are instantaneously recovered to a value nearly equal to a preset pressure level Pop requisite for normal operation as viewed at time instant t4 in FIG. 3.

When the pressure at point P1 in the upstream side of the hydrogen control valve 11 and the pressure at point P2 in the downstream side are recovered to the value nearly equal to the preset pressure requisite for normal operation, the control unit 5 discriminates in step S1-16 whether or not the cell voltage produced after purge operation discussed above exceeds the preset reference voltage. In the event that the cell voltage is recovered due to purge treatment and exceeds the preset reference value, purge sequence is terminated in step S1-17 and operation returns to the normal mode.

If, in step S1-16, the cell voltage is lower than the preset reference value, the control unit 5 judges that surplus moisture in the fuel cell stack 1 is not completely removed, and operation returns to step S1-8 and then steps S1-8 to S1-15 are repeated.

In the first embodiment of the fuel cell system according to the present invention, when surplus moisture is accumulated in the fuel cell stack 1, surplus moisture is purged from the fuel cell stack 1. Accordingly, the fuel cell system of the embodiment makes it possible to effectively prevent the voltage drop in the fuel cell caused by surplus moisture that is accumulated in the fuel cell stack 1 and to maintain the fuel cell stack 1 in its normal operating mode.

In the fuel cell system of the embodiment, further, since moisture is purged from the fuel cell stack 1 by controlling the opening degree of the hydrogen control valve 11 and by controlling the drawing power of the hydrogen draw pump 12, the fuel cell system is not complicated in structure and purge of moisture is desirably performed with an extremely simplified structure.

In the fuel cell system of the embodiment present invention, also, since the operating pressure of the fuel cell stack 1 is not required to be raised to a higher level with a view to purging moisture, it is possible to decrease remarkable electric power consumption that would be caused when the operating pressure of the fuel cell stack 1 is raised at the higher level. In the fuel cell system of the embodiment, more particularly, the hydrogen draw pump 1 is intended to work for surplus hydrogen gas that is not reacted in the fuel cell stack 1 for electric power production and is exhausted from the fuel cell stack 1. In addition, when the stoichiometric ratio in the side of the fuel electrode of the fuel cell stack 1 has a small value, the amount of work done by the hydrogen draw pump 12 is little. Since purge of moisture is achieved with such a little work, electric power consumption can be remarkably reduced to a lower level than that requisite for a case where moisture is purged with a high operating pressure caused in the fuel cell stack 1.

In the fuel cell system of the embodiment, further, surplus hydrogen gas that is not contributed for producing electric power in the fuel cell stack 1 is combusted in the combustor 4 to provide a thermal energy. Since this thermal energy is imparted to parts such as the reformer 6 of the hydrogen supply unit 2 where the thermal energy is required, surplus hydrogen exhausted from the fuel cell stack 1 is effectively utilized, and the fuel cell stack 1 can be operated in a highly efficient fashion.

A second embodiment of a fuel cell system according to the present invention will be described with reference to FIG. 4. In this illustrated embodiment, the fuel cell system is characterized that a hydrogen tank 13 is located between the hydrogen control valve 11 and the hydrogen draw pump 12 to momentarily store hydrogen gas exhausted from the fuel cell stack 1. Other parts of the fuel cell system of FIG. 4 are identical to those of FIG. 1 and, therefore, only an essential part of this illustrated embodiment is described in detail.

Figure 4:
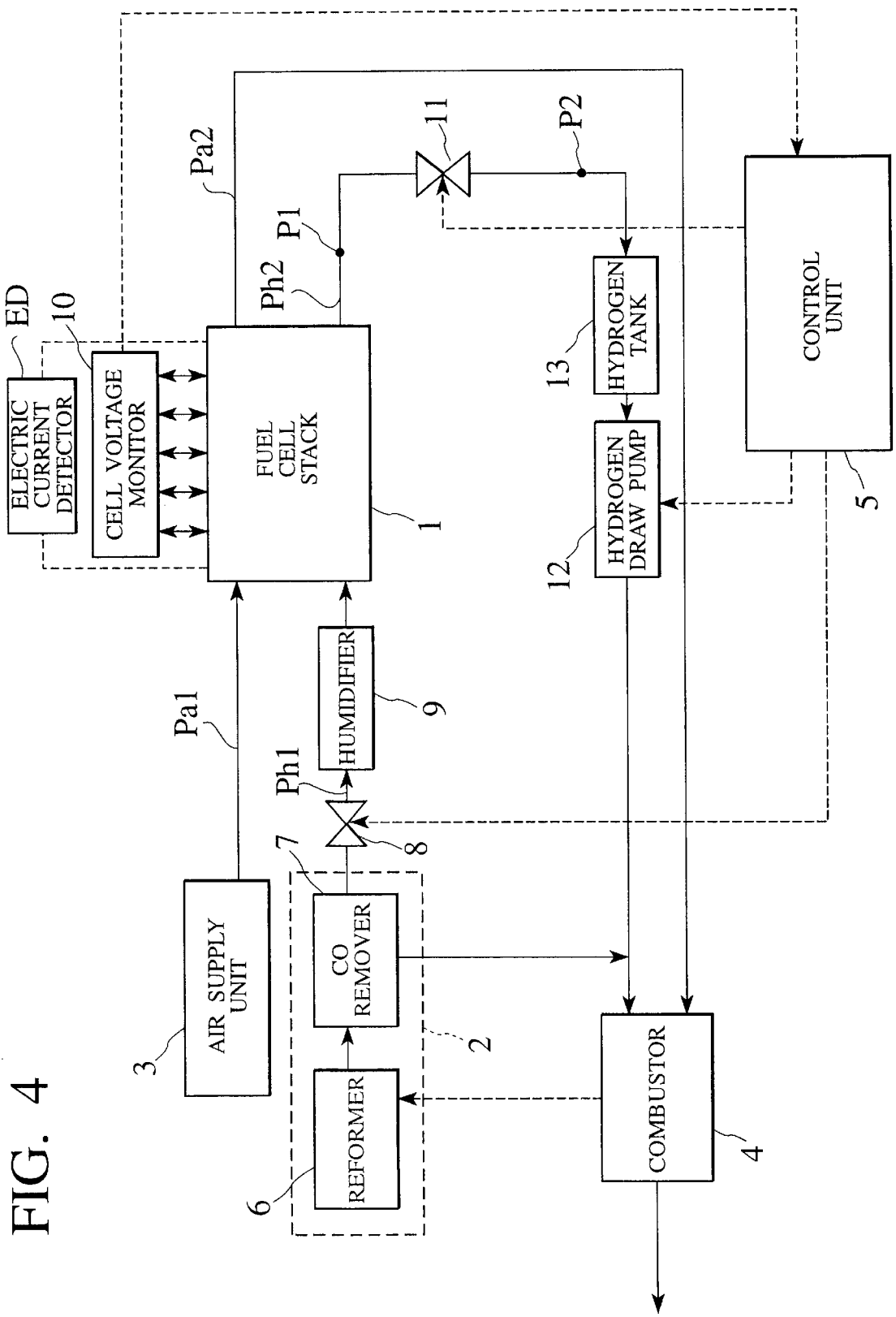
FIG. 4 is a block diagram of a second embodiment of a fuel cell system according to the present invention.

In the fuel cell system of FIG. 4, moisture remaining in the fuel cell stack 1 can be purged in the same purge sequence as that of the fuel cell system shown in FIG. 1. In the fuel cell system shown in FIG. 4, since the hydrogen tank 13 is located between he hydrogen control valve 11 and the hydrogen draw pimp 12, a low pressure zone having a large volume is formed at the downstream side of the hydrogen control valve 11 when the opening degree of the hydrogen control valve 11 is reduced to a low level. That is, when the hydrogen tank 13 is located between the hydrogen control valve 11 and the hydrogen draw pump 12, the low pressure zone is formed both by the volumes of the hydrogen control valve 11 and the hydrogen draw pump 12 and the volume of the hydrogen tank 13.

Accordingly, in the fuel cell system of the second embodiment, when the hydrogen control valve 11 is opened and moisture is purged from the fuel cell stack 1, a large amount of hydrogen gas can be exhausted from the fuel cell stack 1 and, therefore, moisture can be purged in a highly efficiency fashion.

In the second embodiment of the fuel cell system, further, since the hydrogen tank 13 is located between the hydrogen control valve 11 and the hydrogen draw pump 12 and the volume of the low pressure zone is increased, the hydrogen gas passing through the hydrogen control valve 11 enters the low pressure zone having the large volume and the speed energy of the hydrogen gas is absorbed by the low pressure zone. Thus, the combustor 4 is prevented from being rapidly supplied with the hydrogen gas at a large flow rate.

Accordingly, in the second embodiment of the fuel cell system, it is possible to prevent excessive temperature rise in the combustor 4 that would be caused when the combustor 4 is instantaneously supplied with hydrogen gas at the large flow rate and, therefore, the combustor 4 is prevented from being lowered in operating performance.

A third embodiment of a fuel cell system according to the present invention will be described with reference to FIG. 5, with like parts bearing the same reference numerals as those used in FIG. 1. In the third embodiment of the fuel cell system of FIG. 5, a hydrogen recirculation passage Ph3 is connected with the exhaust hydrogen passage Ph2 extending from the downstream side of the fuel cell stack 1 to recirculate the surplus hydrogen gas to the fuel cell stack 1, and the hydrogen control valve 11 and the hydrogen draw pump 12 are located in the hydrogen recirculation passage Ph3. Other parts of the fuel cell system of FIG. 5 is substantially identical to those shown in FIG. 1 and operates in the similar manner and, therefore, an essential feature of the third embodiment of the fuel cell system will be described below.

Figure 5:
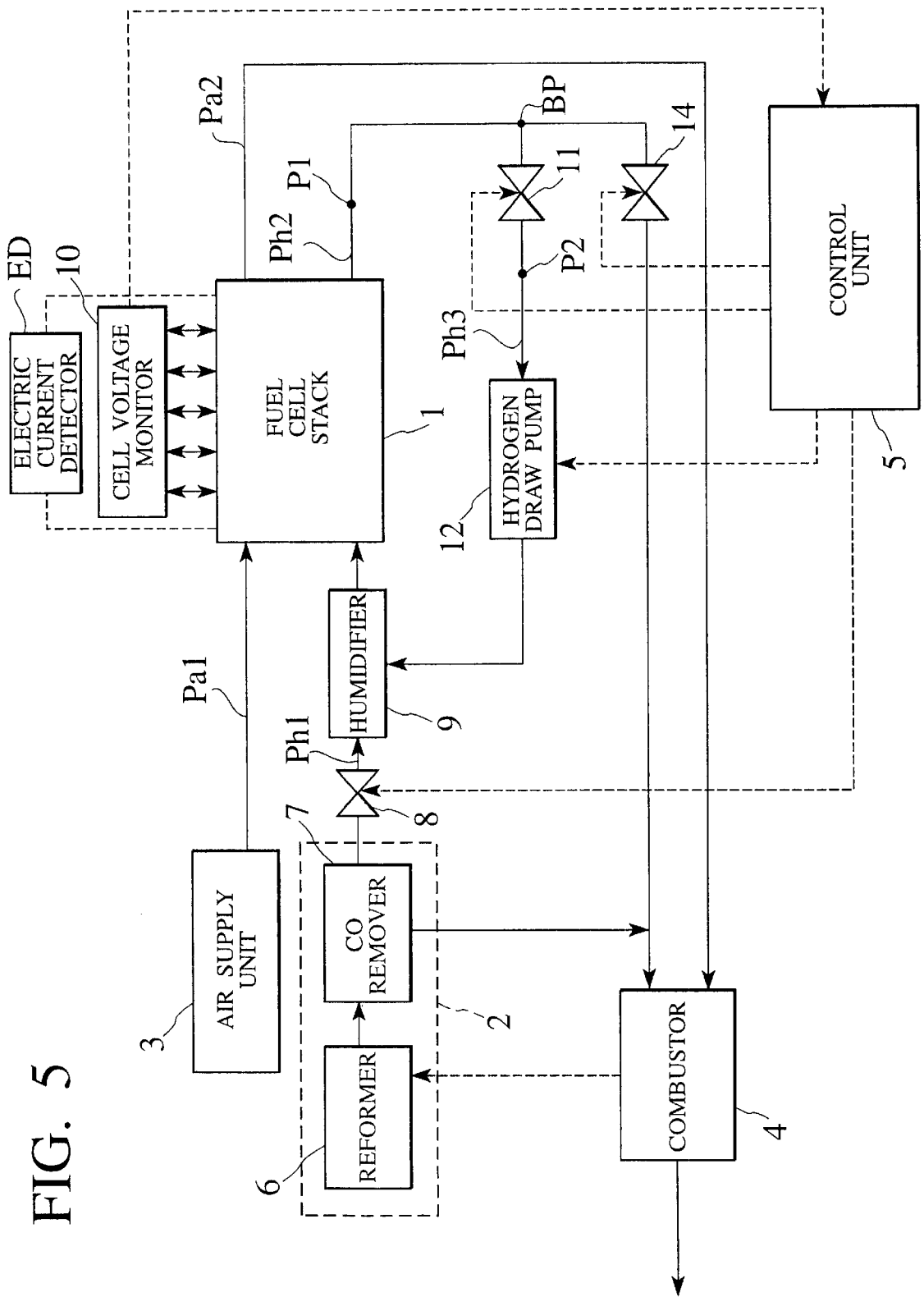
FIG. 5 is a block diagram of a third embodiment of a fuel cell system according to the present invention.

In the third embodiment of the fuel cell system of FIG. 5, the exhaust hydrogen gas passage Ph2 has a second hydrogen control valve 14 to regulate the flow rate of surplus hydrogen gas to be supplied to the combustor 4. The second hydrogen control valve 14 are designed such that it is kept in a closed state or kept in its small opening state and all of or most of the surplus hydrogen gas flowing from the fuel cell stack 1 is recirculated through the recirculation passage Ph3.

The third embodiment of the fuel cell system of FIG. 5 operates in the same purge sequence as that of the fuel cell system of FIG. 1 such that moisture remaining in the fuel cell stack 1 can be purged. In the fuel cell system of FIG. 5, since hydrogen gas exhausted from the fuel cell stack 1 is recirculated through the recirculation passage Ph3 and is supplied to the fuel cell stack 1 again, hydrogen gas exhausted from the fuel cell stack 1 can be effectively utilized and a utilization efficiency of hydrogen gas can be increased such that the amount of hydrogen gas to be supplied to the fuel cell stack 1 from the hydrogen supply unit 2 can be reduced. Since, also, the amount of hydrogen gas to be recirculated through the recirculation passage Ph3 is caused to vary in dependence on the variation in the stoichiometric ratio at the fuel electrode or the variation in the flow rate of the hydrogen gas to be supplied to the combustor 4, it is desired that the control unit 5 controls the flow control valve 8 in dependence on the variation in the flow rate of the hydrogen gas to be recirculated for thereby varying the flow rate of hydrogen gas to be newly supplied to the fuel cell stack 1 from the hydrogen supply unit 2.

Since, in the third embodiment of the fuel cell system, moisture purged from the fuel cell stack 1 is recirculated through the exhaust gas recirculation passage Ph3 and the humidifier 9 to the fuel cell stack 1 together with surplus hydrogen gas exhausted from the fuel cell stack 1, moisture recovered from the fuel cell stack 1 can be effectively utilized and a utilization efficiency of water is increased. Since, further, moisture exhausted from the fuel cell stack 1 due to purging of moisture comprises liquid component, it is desired that, when the temperature of hydrogen gas to be supplied to the fuel cell stack 1 is at low level and moisture can not be evaporated with thermal energy of hydrogen gas, an evaporator may be located in the hydrogen recirculation passage Ph3 to evaporate liquid component in moisture, or a condenser may be provided to condense liquid component that is supplied to the fuel cell stack 1 again.

In the third embodiment of the fuel cell system, further, the hydrogen control valve 11 may be located as shown by a dotted line at a position upstream of a junction between the exhaust hydrogen passage Ph2 and the hydrogen recirculation passage Ph3 to have the similar effect.

A fourth embodiment of a fuel cell system according to the present invention will be described with reference to FIG. 6. The fuel cell system of FIG. 6 is similar in structure with the fuel cell system shown in FIG. 5, and the same parts bear the same reference numerals as those shown in FIG. 5.

In the fourth embodiment of the fuel cell system, the second hydrogen control valve 14 is located in the exhaust hydrogen passage Ph2 between the fuel cell stack 1 and the combustor 4 in parallel to the first hydrogen control valve 11 and is designed to have an opening degree that is controlled by the control unit 5 to purge moisture from the fuel cell stack 1. In the fourth embodiment of the fuel cell system, further, the second hydrogen control valve 14 is designed to be closed or to have the reduced opening degree as in the fuel cell system of FIG. 5 during normal operation of the fuel cell system and, thus, all of or most of hydrogen gas exhausted from the fuel cell stack 1 is recirculeted through the hydrogen gas recirculation passage Ph3.

Figure 6:
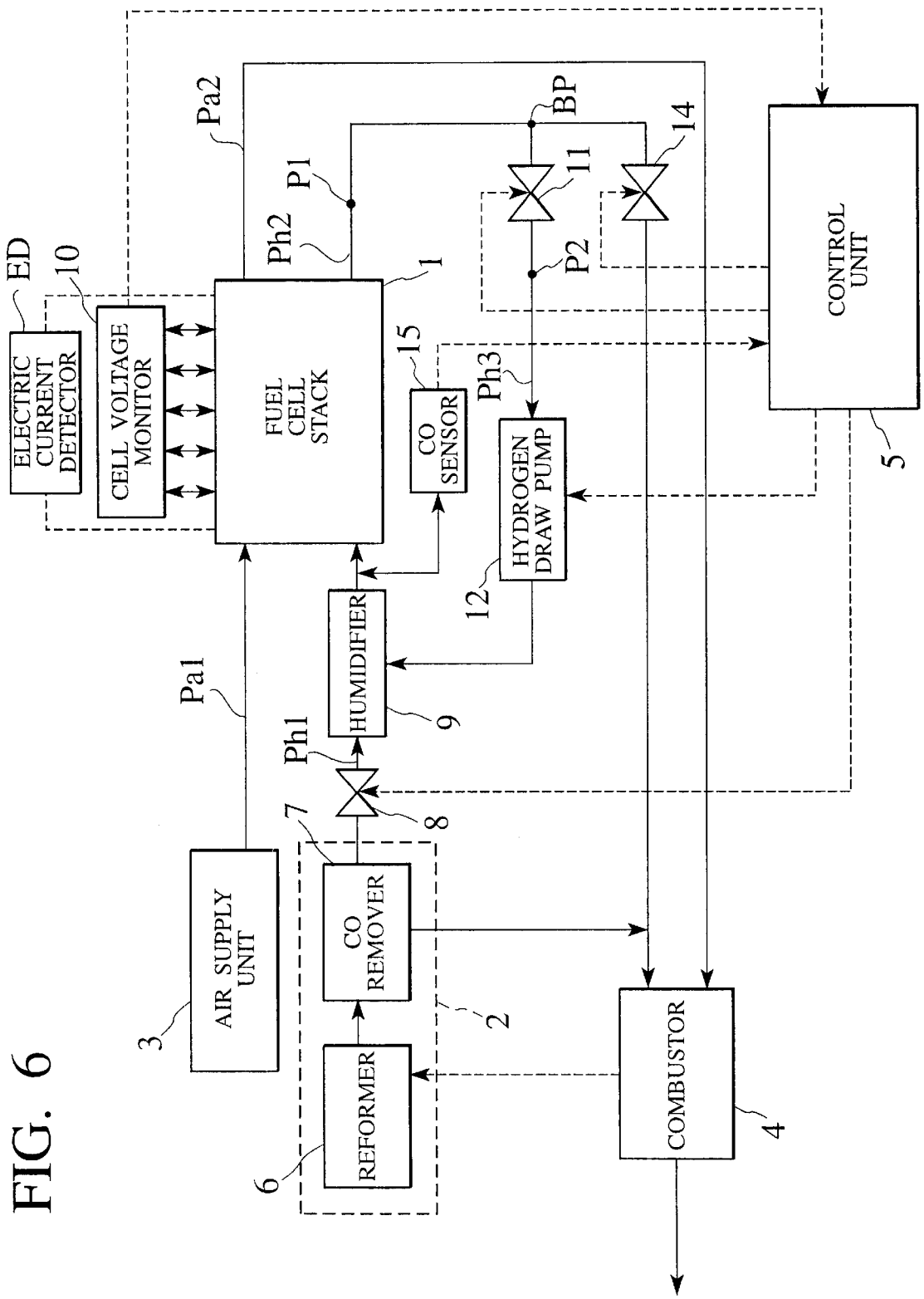
FIG. 6 is a block diagram of a fourth embodiment of a fuel cell system according to the present invention.

In the fuel cell system of FIG. 6, moreover, moisture is purged from the fuel cell stack 1 and, simultaneously, CO concentration contained in the hydrogen gas that is recirculated through the hydrogen recirculation passage Ph3 is lowered. To this, end, a CO sensor 15 is connected to an upstream side of the fuel cell stack 1.

Figure 7:
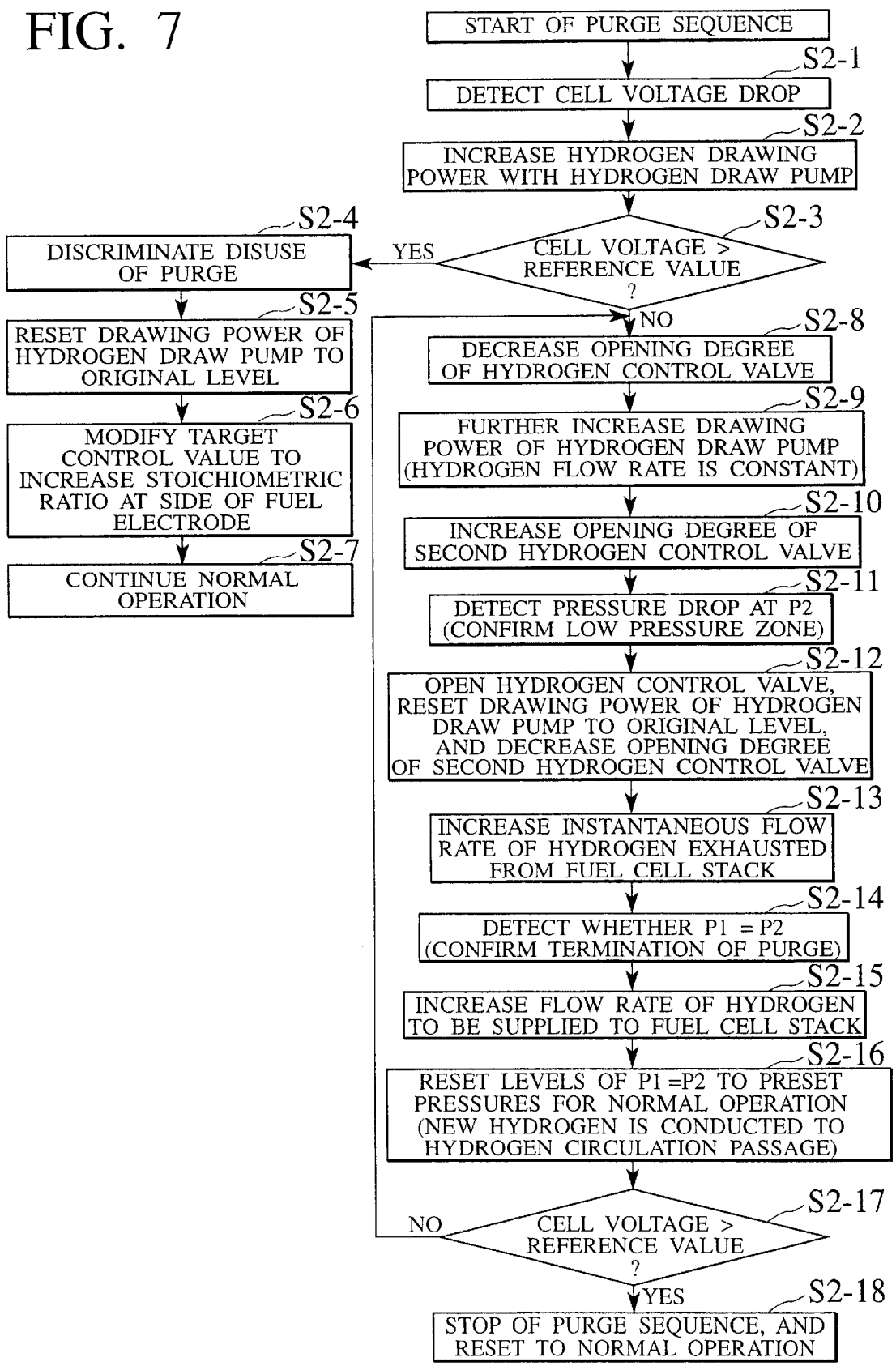
FIG. 7 is a general flow diagram for illustrating the basic sequence of operation of the fuel cell system according to the fourth embodiment.

In the fuel cell system of FIG. 6, further, moisture purge process for purging moisture from the fuel cell stack 1 is slightly different from those of the first to third embodiments of the fuel cell systems which have been discussed above. A moisture purging process for purging moisture remaining in the fuel cell stack 1 in accordance with the fourth embodiment of the fuel cell system will be described below in detail with reference to FIG. 7.

In this illustrated embodiment, at the start, e.g., when purge sequence is started, a voltage drop of the fuel cell stack 1 is detected by the cell voltage monitor 10, in the execution step S2-1, that produces an output signal representing a cell voltage drop. The output signal is then inputted to the control unit 5. The control unit 5 controls the flow control valve 8 such that the stoichiometric ratio is momentarily lowered.

In the next step S2-2, the control unit 5 functions to increase the operating time of the hydrogen draw pump 12 to a value greater than that required for a normal operation. As a result, a drop in the stoichiometric ratio at the side of the fuel electrode is restricted in a purge sequence.

In the succeeding step S2-3, the control unit 5 judges whether output voltage of the fuel cell, produced after the operating time of the hydrogen draw pump 12 is increased to thereby increase hydrogen drawing power, is higher than a preset reference voltage. When the cell voltage is recovered due to an increase in the stichiometric ratio at the side of the fuel electrode owing to the increase in the hydrogen drawing power of the hydrogen draw pump 12 and the cell voltage exceeds the reference voltage, the control unit 5 discriminates, in step S2-4, that purge of moisture is unnecessary, and functions in step S2-5 to reset the drawing power of the hydrogen draw pump 12 to the original level. Since, in this event, it is necessary to increase the stoichiometric ratio at the side of the fuel electrode again when the drawing power of the hydrogen draw pump 12 is returned to the original level, the control unit 5 modifies a control target value in step S2-6 such that the stoichiometric ratio at the side of the fuel electrode is increased. In step S2-7, the normal operation of the fuel cell stack 1 is continued.

On the other hand, in the event that the control unit 5 detects in step S2-3 that the cell voltage produced after the operating time of the hydrogen draw pump 12 is increased to thereby increase hydrogen drawing power, is lower than the reference voltage, the control unit 5 judges that surplus moisture remains in the fuel cell stack 1. Thus, in step S2-8, the control unit 5 decreases the opening degree of the hydrogen control valve 11 such that the hydrogen control valve 11 has increased pressure losses.

In the above step, if the hydrogen drawing power of the hydrogen draw pump 12 is left as it is, this causes a reduction in flow rate of the hydrogen gas to be exhausted from the fuel cell stack 1and, in step S2-9, the control unit 5 further increases the drawing power of the hydrogen draw pump 12 by an amount equal to a value corresponding to the pressure losses caused by the hydrogen control valve 11. Accordingly, the pressure at point P1 in the leading stage of the hydrogen control valve 11 is kept at substantially constant level. In this event, the flow rate of hydrogen gas passing through the hydrogen control valve 11 does not vary in a wide range and the pressure at point P2 in the trailing stage of the hydrogen control valve 11 is lowered.

In the next step S2-10, the control unit 5 increases the opening degree of the hydrogen control valve 14. Therefore, the hydrogen gas exhausted from the fuel cell stack 1 is supplied through the second hydrogen control valve 14 to the combustor 4. In this event, since the flow rate of hydrogen gas to be supplied from the hydrogen supply unit 2 and the hydrogen draw pump 12 does not vary and, consequently, there is no variation in the flow rate of hydrogen passing through the fuel cell stack 1. On the contrary, the flow rate of hydrogen gas to be supplied to the combustor 4 increases and, in this event, the opening degree of the hydrogen control valve 11 is slowly decreased and the drawing power of the hydrogen draw pump 12 is slowly increased while the opening degree of the second hydrogen control valve 14 is slowly increased such that it is possible to prevent the combustor 4 from being rapidly supplied with a large amount of hydrogen gas, thereby preventing an excessive temperature rise in he combustor 4 in a reliable manner.

In the next step S2-11, when the pressure drop at point P2 in the downstream side of the hydrogen control valve 11 is detected and when a low pressure zone is confirmed at a sufficient level in the downstream side of the hydrogen control valve 11, the control unit 5 releases the hydrogen control valve 11 in step S2-12 and decreases the drawing power of the hydrogen draw pump 12 to its original level requisite for normal operation. In addition, the control unit 5 decreases the opening degree of the second control valve 14. In the succeeding step S2-13, the flow rate of the hydrogen gas exhausted from the fuel cell stack 1 is instantaneously increased and moisture is removed with surplus hydrogen gas. Also, it is possible to prevent exhaust hydrogen gas from being undesirably reversed to the hydrogen recirculation passage Ph3 from the exhaust hydrogen passage Ph2.

It will now be understood from the foregoing description that after the flow rate of the hydrogen gas exhausted from the fuel cell stack 1 is instantaneously increased and the moisture is purged, the pressure at point P1 in the upstream side of the hydrogen control gas 11 and the pressure at point P2 in the downstream side remain at a level slightly lower than the original level required for normal operation. In step S2-14, when it is detected that the pressure at point P1 in the upstream side of the hydrogen control vale 11 substantially equals the pressure at point P2 in the downstream side thereof and that purge of moisture is terminated, the control unit 5 controls the flow control valve 8 in step S2-15 such that the flow rate of hydrogen gas to be supplied to the fuel cell stack 1 from the hydrogen supply unit 2 is increased. In step S2-16, accordingly, the pressure at point P1 in the upstream side of the hydrogen control valve 11 and the pressure at point P2 in the downstream side are instantaneously recovered to have a value nearly equal to a preset pressure level determined for normal operation. In this event, hydrogen gas flowing from the hydrogen supply unit 2 is supplied to the combustor 4 through the exhaust hydrogen passage Ph2.

When the pressure at point P1 in the upstream side of the hydrogen control valve 11 and the pressure at point P2 in the downstream side are recovered to the value nearly equal to the preset pressure for normal operation, the control unit discriminates in step S2-17 whether or not the cell voltage produced after purge operation discussed above exceeds the preset reference voltage. In the event that the cell voltage is recovered owing to the purging treatment and exceeds the preset reference value, purge sequence is terminated in step S2-18 and operation returns to normal mode.

If, in step S2-17, the cell voltage is lower than the preset reference value, the control unit 5 judges that surplus moisture in the fuel cell stack 1 is not completely removed, and operation returns to step S2-8 and then a series of purge operation are repeated.

In the fourth embodiment of the fuel cell system according to the present invention, when surplus moisture is accumulated in the fuel cell stack 1, surplus moisture is purged from the fuel cell stack 1 and, simultaneously, CO concentration contained in hydrogen gas passing through the hydrogen recirculation passage Ph3. More particularly, since hydrogen gas exhausted from the fuel cell stack 1 is recirculated through the hydrogen recirculation passage Ph3, CO concentration contained in the hydrogen gas flowing through the hydrogen recirculation passage Ph3 gradually increases. In this event, when moisture is purged from the fuel cell stack 1 in the purge sequence discussed above, the opening degree of the second hydrogen control valve 14 is increased such that hydrogen gas having a high CO concentration is caused to flow through the second hydrogen control valve 14 to the combustor 4. Also, when the opening degree of the second control valve 14 is decreased, the flow rate of hydrogen gas to be supplied from the hydrogen supply unit 2 is increased such that the combustor 4 is supplied with hydrogen gas exhausted from the fuel cell stack 1 and containing a low CO concentration owing to an increase in the flow rate of hydrogen gas supplied from the hydrogen supply unit 2. Accordingly, when the purge sequence is terminated and the operation returns to the normal operation mode, the CO concentration of hydrogen gas to be circulated through the hydrogen passage Ph3 is lowered.

In the fourth embodiment of the fuel cell system of the present invention, also, the CO sensor 15 detects the CO concentration of hydrogen gas flowing through the hydrogen passage Ph1 to produce a CO detection signal. When the CO detection signal exceeds a preset reference value, the purge sequence is carried out, even in a case where it is not required to purge moisture from the fuel cell stack 1, such that a priority is given to lower the CO concentration of hydrogen gas. Since, in this event, it is unnecessary to increase the instantaneous flow rate of the hydrogen gas to be exhausted from the fuel cell stack 1, instantaneous opening of the hydrogen gas control valve 11 is not necessarily carried out.

A fifth embodiment of the fuel cell system according to the present invention will be described with reference to FIG. 8. The fuel cell system of FIG. 8 is identical in structure to the fuel cell system of FIG. 1 with a exception that the hydrogen control valve 11 and the hydrogen draw pump 12 are located in the exhaust hydrogen passage Ph2 and, in addition, an air control valve 16 and an air draw pump 17 are located in the exhaust air passage Pa2 and a re controlled by the control unit 5.

Figure 8:
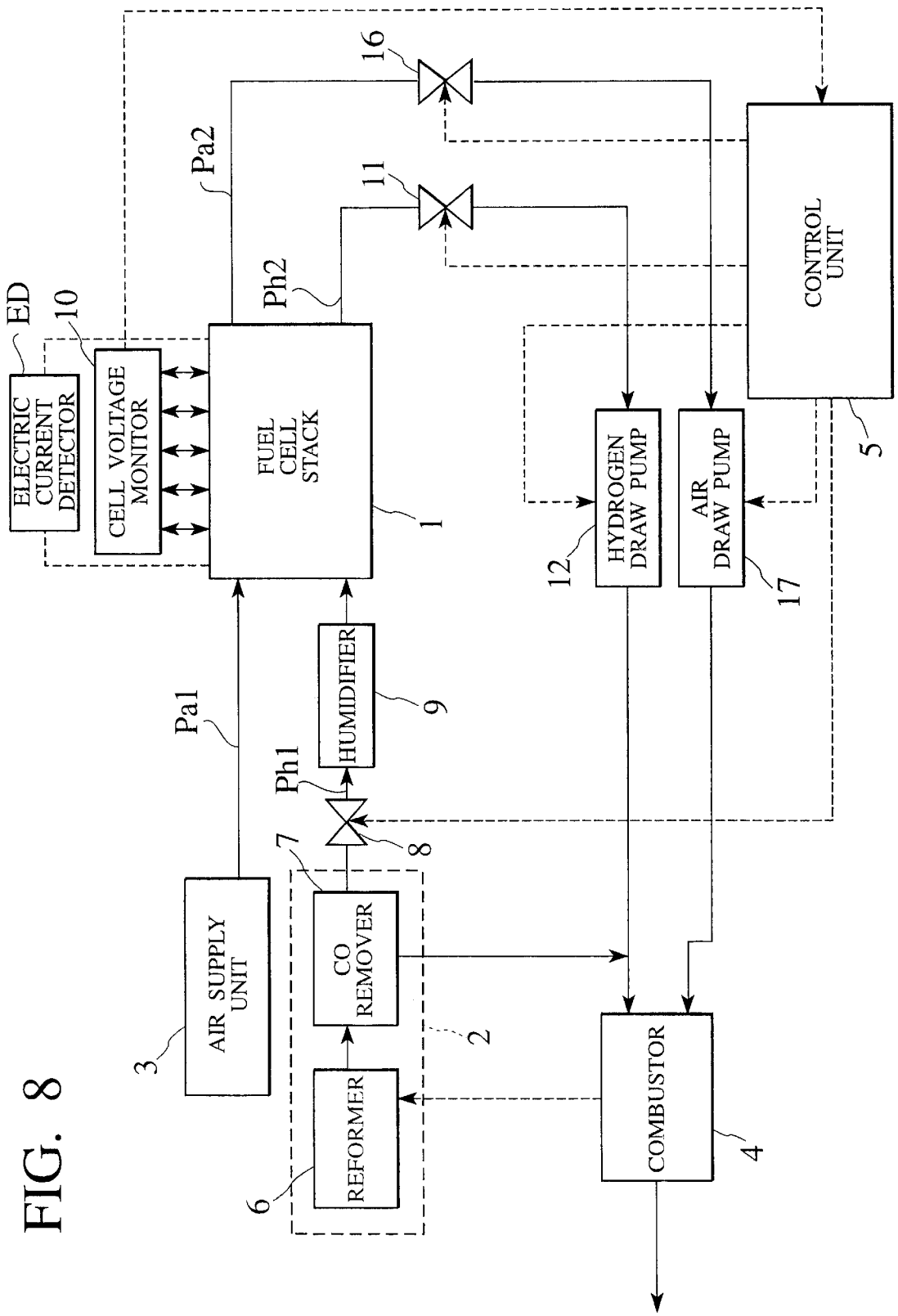
FIG. 8 is a block diagram of a fifth embodiment of a fuel cell system according to the present invention.

In the fuel cell system of FIG. 8, the air control valve 16 and the air draw pump 17 are connected between the fuel cell stack 1 and the combustor 4 and have the same structure as that of the hydrogen control valve 11 and the hydrogen draw pump 12 such that the hydrogen control valve 11 and the hydrogen draw pump 12 and the air control valve 16 and the air draw pump 17 are controlled in a simultaneous fashion to suitably purge moisture from the fuel cell stack 1 without causing a large pressure difference between the hydrogen exhaust side and the air exhaust side.

More specifically, when moisture is purged from the fuel cell stack 1, if there exists the large pressure difference between the hydrogen exhaust side and the air exhaust side, the polymer membrane used in the fuel cell stack 1 as the electrolyte may be deteriorated in an operating performance. In the fuel cell system of FIG. 8, however, the air exhaust passage Pa2 has the air control valve 16 and the air draw pump 17 such that these parts provide the air exhaust side having the same structure as the hydrogen exhaust side constituted by the hydrogen control valve 11 and the hydrogen draw pump 12. In the purge sequence of FIG. 2, the opening degree of the hydrogen control valve 11 is controlled and, simultaneously, the opening degree of the air control valve 16 is also controlled while the drawing power of the hydrogen draw pump 12 is controlled and, simultaneously, the drawing power of the air draw pump 17 is also controlled. With such a simultaneous control, moisture can be purged from the fuel cell stack 1 while keeping the pressures at the air exhaust side and the hydrogen exhaust side to a substantially equal level at all times. Thus, the polymer membrane can be prevented from being seriously deteriorated due to the pressure difference caused in the air exhaust side and the hydrogen exhaust side, thereby suitably achieving moisture purge.

In the fuel cell system of FIG. 8, further, the control of the hydrogen control valve 11 and the hydrogen draw pump 12 and the control of the air control valve 16 and the air draw pump 17 are simultaneously achieved, and the combustor 4 is supplied with exhaust hydrogen gas and exhaust air at equally controlled flow rates, respectively, overheating of the combustor 4 can be reliably avoided and the combustor 4 can be prevented from being seriously deteriorated in its operating performance.

A sixth embodiment of the fuel cell system according to the present invention will be described with reference to FIG. 9. The fuel cell system of FIG. 9 has a basic structure identical to that of FIG. 8 with the exception that the hydrogen tank 13 is connected between the hydrogen control valve 11 and the hydrogen draw pump 12 to momentarily store hydrogen gas exhausted from the fuel cell stack 1, and an air tank 18 is connected between the air control valve 16 and the air draw pump 17 to momentarily store air exhausted from the fuel cell stack 1.

Figure 9:
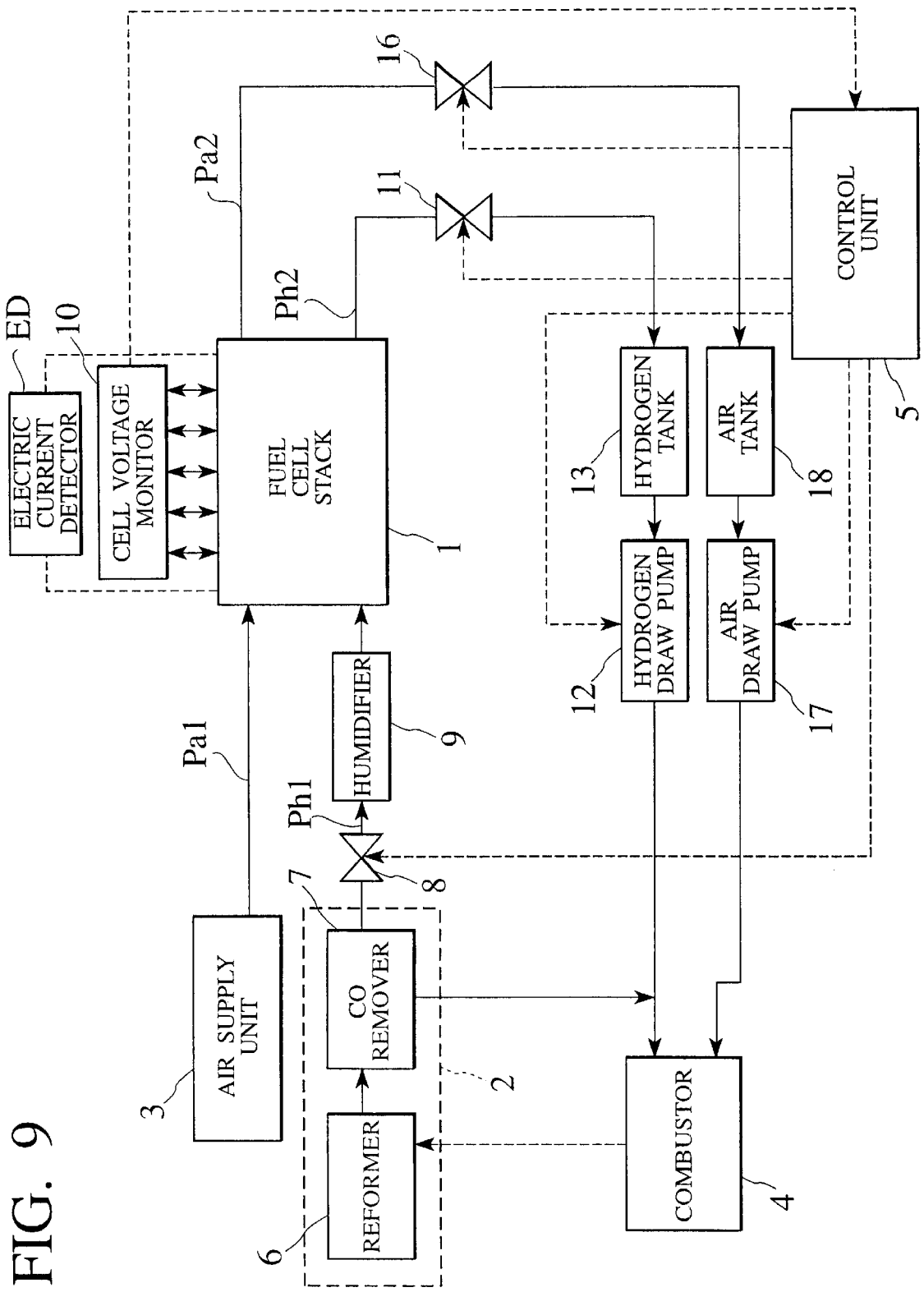
FIG. 9 is a block diagram of a sixth embodiment of a fuel cell system according to the present invention.

In the fuel cell system of FIG. 9, since the air control valve 16 and the air draw pump 17 are located in the air exhaust passage Pa2 and the air tank is connected between the air control valve 16 and the air draw pump 17 while the hydrogen control valve 11 and the hydrogen draw pump 12 are located in the hydrogen exhaust passage Ph2 and the hydrogen tank 13 is connected between the hydrogen control valve 11 and the hydrogen draw pump 12, the air exhaust side and the hydrogen exhaust side have the same structure as those shown in FIG. 8. By simultaneously carrying out the control of the hydrogen control valve 11 and the hydrogen draw pump 12 and the control of the air control valve 16 and the air draw pump 18 in the same purge sequence as that carried out in the embodiment of FIG. 5, it is possible to suitably purge moisture from the fuel cell stack 1 without causing a large pressure difference between the air exhaust side and the hydrogen exhaust side that would cause a deterioration of operating performance of the polymer membrane.

In the fuel cell system of FIG. 9, also, since the hydrogen tank 13 is connected between the hydrogen control valve 11 and the hydrogen draw pump 12 as in the embodiment of FIG. 4, a large volume of low pressure zone is created at a point downstream of the hydrogen control valve 11 when the opening degree of the hydrogen control valve 11 is decreased such that, when the hydrogen control valve 11 is opened and moisture is purged from te fuel cell stack 1, a large amount of hydrogen gas can be exhausted from the fuel cell stack 1 and moisture purge can be performed in a remarkably efficient manner.

In the fuel cell system of FIG. 9, further, the control of the hydrogen control valve 11 and the hydrogen draw pump 12 and the control of the air control valve 16 and the air draw pump 17 are simultaneously carried out such that the exhaust hydrogen and exhaust air cane be supplied to the combustor 4 at equally controlled rates such that the combustor 4 can be reliably prevented from being overheated and from being deteriorated in the operating performance.

The fuel system and the method controlling the same of the present invention provides numerous advantages as summarized below.

The operating controls can be greatly simplified. Unlike the related art processes which must increase the operating pressure of a fuel cell to purge moisture from a fuel cell stack with a resultant complicated structure caused in a fuel cell system and an increased electric power consumption, the fuel cell system of the present invention will normally require a simplified operating process for purging moisture from the fuel cell stack with a simple structure. The obvious result is the elimination of costly and sophisticated process controls which are necessary to maintain the fuel cell system at an increased pressure in the related art processes. Another merit resides in the fact that moisture can be effectively purged at desired timings without sacrifice to the basic operation of the fuel cell of the polymer electrolyte type.

Since at least a portion of hydrogen gas exhausted from a fuel cell stack is combusted in a combustor to produce a thermal energy, exhaust hydrogen gas can be effectively utilized and supplied to various parts that need the thermal energy.

The fuel cell system of the present invention incorporates a hydrogen control valve that provides a sufficient amount of volume in a low pressure zone formed at a downstream side of a fuel cell stack. Accordingly, when a control unit fully opens the hydrogen control valve, a sufficient amount of hydrogen gas can be exhausted from the fuel cell stack such that moisture can also be purged from the fuel cell stack in a highly reliable manner.

The fuel cell system of the present invention incorporates an exhaust hydrogen gas recirculation passage connected between an inlet and an outlet of a fuel cell stack with a view to recirculating at least a portion of exhaust hydrogen gas to the inlet of the fuel cell stack. Consequently, the system of the present invention has higher power output capacity per unit volume of input hydrogen gas because the exhaust hydrogen gas is recycled for producing electric power output. Thus, it is possible to maintain a high rate of conversion of hydrogen gas to electric power output. Further, since the amount of hydrogen gas to be supplied to the fuel cell stack is reduced, it is possible to employ a reformer that is small in size and low in cost. In addition, since a portion of moisture purged from the fuel cell stack is also recycled with exhaust hydrogen gas flowing through the exhaust hydrogen recirculation passage, it is possible to reduce the amount of water to be evaporated and to employ a humidifier which is small in size and which needs a reduced amount of input electric power. Also, due to recirculating exhaust hydrogen gas to the fuel cell stack, hydrogen gas to be supplied to the fuel cell stack has a low concentration of CO such that the life of the fuel cell stack can be effectively extended.

And also, the fuel cell system of the present invention incorporates an exhaust air passage and an exhaust hydrogen passage connected to a fuel cell stack, an air draw pump and hydrogen draw pump located in the exhaust air passage and the exhaust hydrogen gas passage, respectively, and an air control valve and a hydrogen control valve which are located at upstream sides of the air draw pump and the hydrogen draw pump, respectively. With such a structure, it is possible to purge moisture from the fuel cell stack while keeping a pressure balance between the exhaust air passage and the exhaust hydrogen passage. Consequently, it is possible to prevent a polymer electrolyte membrane of a fuel stack from being deteriorated in an operating performance due to pressure difference caused at an exhaust air side and an exhaust hydrogen side.

The entire content of a Patent Application No. TOKUGAN 2000-38397 with a filing date of Feb. 16, 2000 in Japan and those of a Patent Application No. TOKUGAN 2000-390929 with a filing date of Dec. 22, 2000 in Japan are hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A fuel cell system comprising:
   a fuel cell stack having a polymer electrolyte;
   a hydrogen supply unit supplying hydrogen gas to the fuel cell stack;
   an air supply unit supplying air to the fuel cell stack;
   a hydrogen draw pump located at a downstream side of the fuel cell stack and drawing hydrogen gas from the fuel cell stack;
   a first hydrogen control valve located between the fuel cell stack and the hydrogen draw pump and having a controllable opening degree; and
   a control unit controlling operation of the fuel cell system such that, when the control unit discriminates that moisture in the fuel cell stack remains at an excessive level, the control unit increases drawing power of the hydrogen draw pump, decreases the opening degree of the first hydrogen control valve and subsequently opens the first hydrogen control valve to purge moisture from the fuel cell stack by increasing an instantaneous flow rate of exhaust hydrogen gas from the fuel cell stack, accompanied with an increase of pressure at a downstream side of the first hydrogen control valve.

2. A fuel cell system according to claim 1, wherein the control unit controls the operation of the fuel cell system such that, when the control unit discriminates that the moisture in the fuel cell stack remains at the excessive level, the control unit increases the drawing power of the hydrogen draw pump to a level larger than that required for normal operation, decreases the opening degree of the first hydrogen control valve to decrease pressure at the downstream side of the fuel cell stack without varying flow rate of hydrogen gas passing through the fuel cell stack in a wide range and subsequently opens the first hydrogen control valve for increasing instantaneous flow rate of hydrogen gas exhausted from the fuel cell stack while purging the moisture from the fuel cell stack.

3. A fuel cell system according to claim 1, further comprising a combustor combusting at least a portion of hydrogen gas exhausted from the fuel cell stack to produce a thermal energy.

4. A fuel cell system according to claim 1, further comprising a hydrogen tank located between the first hydrogen control valve and the hydrogen draw pump to momentarily store hydrogen gas exhausted from the fuel cell stack.

5. A fuel cell system according to claim 3, further comprising a hydrogen recirculation passage to recirculate at least a portion of hydrogen gas exhausted from the fuel cell stack again to the fuel cell stack, the first hydrogen control valve and the hydrogen draw pump being located in the hydrogen recirculation passage.

6. A fuel cell system according to claim 5, further comprising a second hydrogen control valve connected between the fuel cell stack and the combustor in parallel to the first hydrogen control valve located in the hydrogen recirculation passage and having a controllable opening degree, the control unit decreasing the opening degree of the first hydrogen control valve while increasing the opening degree of the second hydrogen control valve and subsequently opening the first hydrogen control valve while decreasing the opening degree of the second hydrogen control valve, when the control unit discriminates that moisture in the fuel cell stack remains at the excessive level.

7. A fuel cell system according to claim 1, further comprising an air draw pump connected to the downstream side of the fuel cell stack to draw air from the fuel cell stack, and an air control valve connected between the fuel cell stack and the air draw pump and having a controllable opening degree, the control unit increasing drawing power of the air draw pump to a level larger than that required for normal operation of the fuel cell stack while increasing the drawing power of the hydrogen draw pump and decreasing the opening degree of the air control valve while decreasing the opening degree of the first hydrogen control valve, and subsequently opening the air control valve while opening the first hydrogen control valve, when the control unit discriminates that moisture in the fuel cell stack remains at the excessive level.

8. A fuel cell system according to claim 7, further comprising an air tank connected between the air control valve and the air draw pump to momentarily store air exhausted from the fuel cell stack.

9. A fuel cell system comprising:

a fuel cell stack having a polymer electrolyte;

a hydrogen supplying means for supplying hydrogen gas to the fuel cell stack;

an air supplying means for supplying air to the fuel cell stack;

a hydrogen drawing means for drawing hydrogen gas from the fuel cell stack;

an adjusting means for adjusting an opening degree with respect to the hydrogen gas from the fuel cell stack;

a controlling means for controlling operation of the fuel cell system such that, when the controlling means discriminates that moisture in the fuel cell stack remains at an excessive level, the controlling means increases drawing power of the hydrogen drawing means, decreases the opening degree of the adjusting means and subsequently opens the adjusting means moisture from the fuel cell stack by increasing an instantaneous flow rate of exhaust hydrogen gas from the fuel cell stack, accompanied with an increase of pressure at a downstream side of the adjusting means.

10. A fuel cell system according to claim 1, wherein the instantaneous flow rate of the exhaust hydrogen gas from the fuel cell stack is generated by opening the first hydrogen control valve.

\* \* \* \* \*